US012250552B2

(12) United States Patent
Filart

(10) Patent No.: US 12,250,552 B2
(45) Date of Patent: Mar. 11, 2025

(54) ENHANCED SELECTIVE ATTESTATION OF WIRELESS COMMUNICATIONS

(71) Applicant: T-MOBILE INNOVATIONS LLC, Overland Park, KS (US)

(72) Inventor: Homer Nicolas B Filart, Renton, WA (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 358 days.

(21) Appl. No.: 17/744,372

(22) Filed: May 13, 2022

(65) Prior Publication Data
US 2023/0370851 A1 Nov. 16, 2023

(51) Int. Cl.
H04W 12/06 (2021.01)
H04W 12/63 (2021.01)
H04W 48/04 (2009.01)

(52) U.S. Cl.
CPC .......... *H04W 12/63* (2021.01); *H04W 12/06* (2013.01); *H04W 48/04* (2013.01)

(58) Field of Classification Search
CPC ...... H04W 12/06; H04W 12/63; H04W 48/04
USPC ....................................... 455/445
See application file for complete search history.

(56) References Cited

U.S. PATENT DOCUMENTS

| | | | |
|---|---|---|---|
| 10,554,821 B1 | 2/2020 | Koster | |
| 10,601,986 B1 | 3/2020 | Botner et al. | |
| 10,893,414 B1 | 1/2021 | Filart et al. | |
| 2011/0265153 A1 | 10/2011 | Guccione et al. | |
| 2012/0190325 A1 | 7/2012 | Abu-Hakima et al. | |
| 2018/0324297 A1 | 11/2018 | Kent et al. | |
| 2018/0352417 A1 | 12/2018 | Butler et al. | |
| 2019/0068594 A1 | 2/2019 | Sarwar et al. | |
| 2019/0068783 A1 | 2/2019 | Archer | |
| 2020/0028690 A1 | 1/2020 | Barakat et al. | |
| 2020/0153959 A1 | 5/2020 | Scivicque | |
| 2020/0221302 A1 | 7/2020 | Filart et al. | |
| 2020/0252503 A1 | 8/2020 | Li | |
| 2021/0203701 A1* | 7/2021 | Lang | H04W 12/02 |
| 2023/0048238 A1* | 2/2023 | Kim | H04W 12/06 |
| 2023/0284016 A1* | 9/2023 | Merchant | H04W 12/40 |
| | | | 455/411 |
| 2024/0147209 A1* | 5/2024 | Menon | H04W 88/06 |

\* cited by examiner

Primary Examiner — Hirdepal Singh
(74) Attorney, Agent, or Firm — SHOOK, HARDY & BACON L.L.P.

(57) ABSTRACT

Methods, media, and systems are provided for enhanced selective attestation of wireless communications. The methods, media, and systems are configured to receive, from a wireless communication network, a request to establish a communication session with a computing device. The request is associated with destination identification data. Additionally, a determination is made as to whether the destination identification data corresponds to a geographic area other than the geographic area associated with the wireless communication network. Based on the determination: the destination identification data is verified using a set of permissible destination identification data or a set of permissible Service Provider IDs. Attestation is then performed in response to verifying the destination identification data using the set of permissible destination identification data or the set of permissible Service Provider IDs.

17 Claims, 7 Drawing Sheets

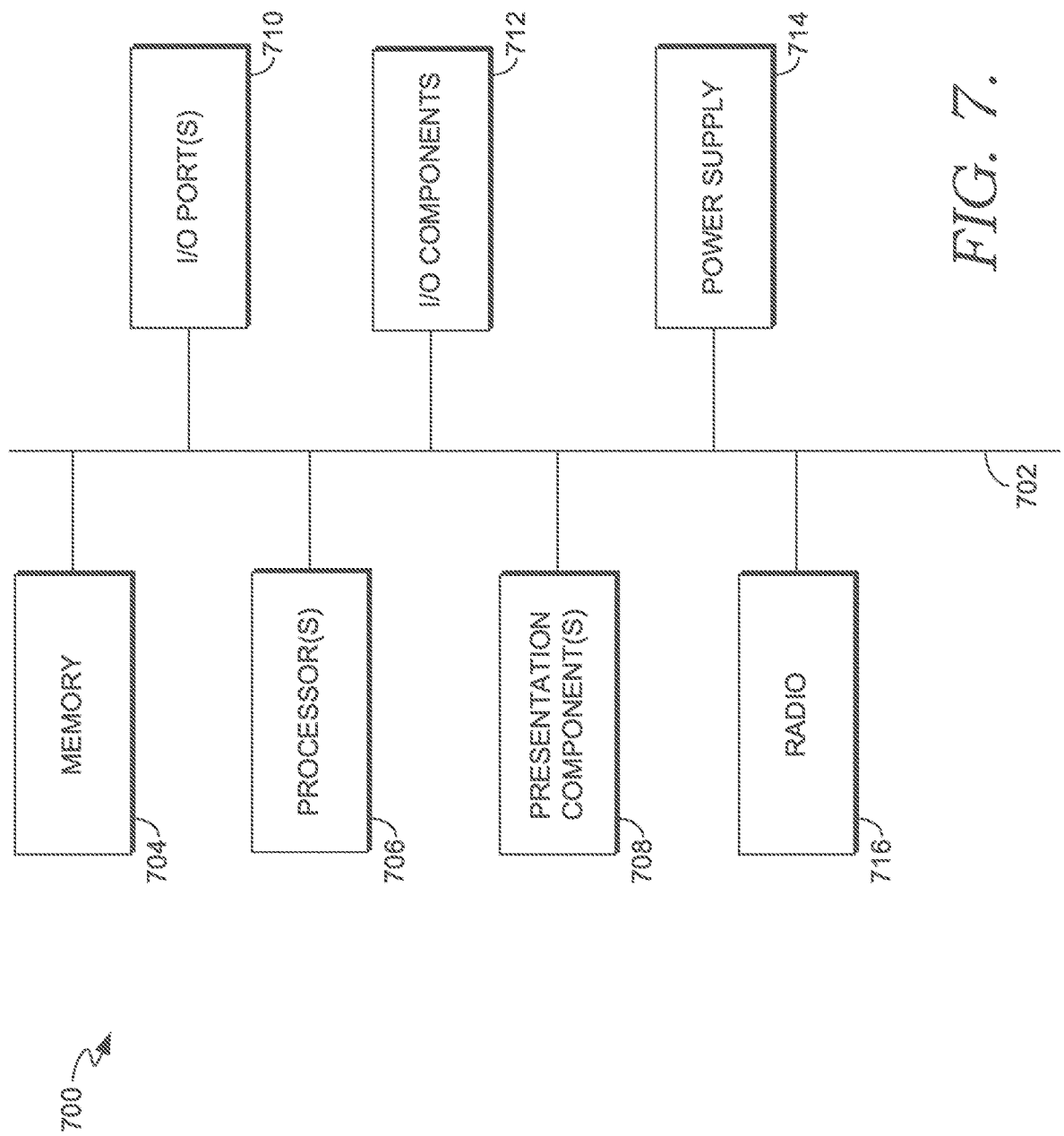

ENHANCED SELECTIVE ATTESTATION OF WIRELESS COMMUNICATIONS

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to systems and methods for enhanced selective attestation of wireless communications, substantially as shown in and/or described in connection with at least one of the figures, and as set forth more completely in the claims.

In aspects set forth herein, and at a high level, the systems and methods receive, from a wireless communication network via a first computing device, a request to establish a communication session with a second computing device. The request and the second computing device are associated with destination identification data. The destination identification data may include, for example, one or more of a prefix including a country code for geographic areas or global services, a national destination code, a subscriber number, a destination network code, or a combination thereof. A processor may determine whether the destination identification data is associated with a geographical area other than the geographical area associated with the wireless communication network. For example, the geographical area may correspond to a first country and the geographical area other than the geographical area may correspond to a territory of the first country (e.g., the territory being physically separated from the country associated with the wireless communication network).

In some aspects, the destination identification data is verified by comparing the destination identification data to a set of permissible destination identification data upon determining that the destination identification data is associated with the geographical area other than the geographical area associated with the wireless communication network. In some aspects, the destination identification data is verified by comparing it to set of permissible Service Provider IDs upon determining that the destination identification data is associated with the geographical area associated with the wireless communication network. Upon verification, attestation is performed in response to verifying the destination identification data. In response to performing attestation, an attestation claim with a digital signature associated with the request is generated and transmitted to the wireless communication network for delivery to another wireless communication network associated with the second computing device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 7 depicts an exemplary computing environment suitable for use in implementations of the present disclosure, in accordance with aspects herein.

DETAILED DESCRIPTION

Figure 1:
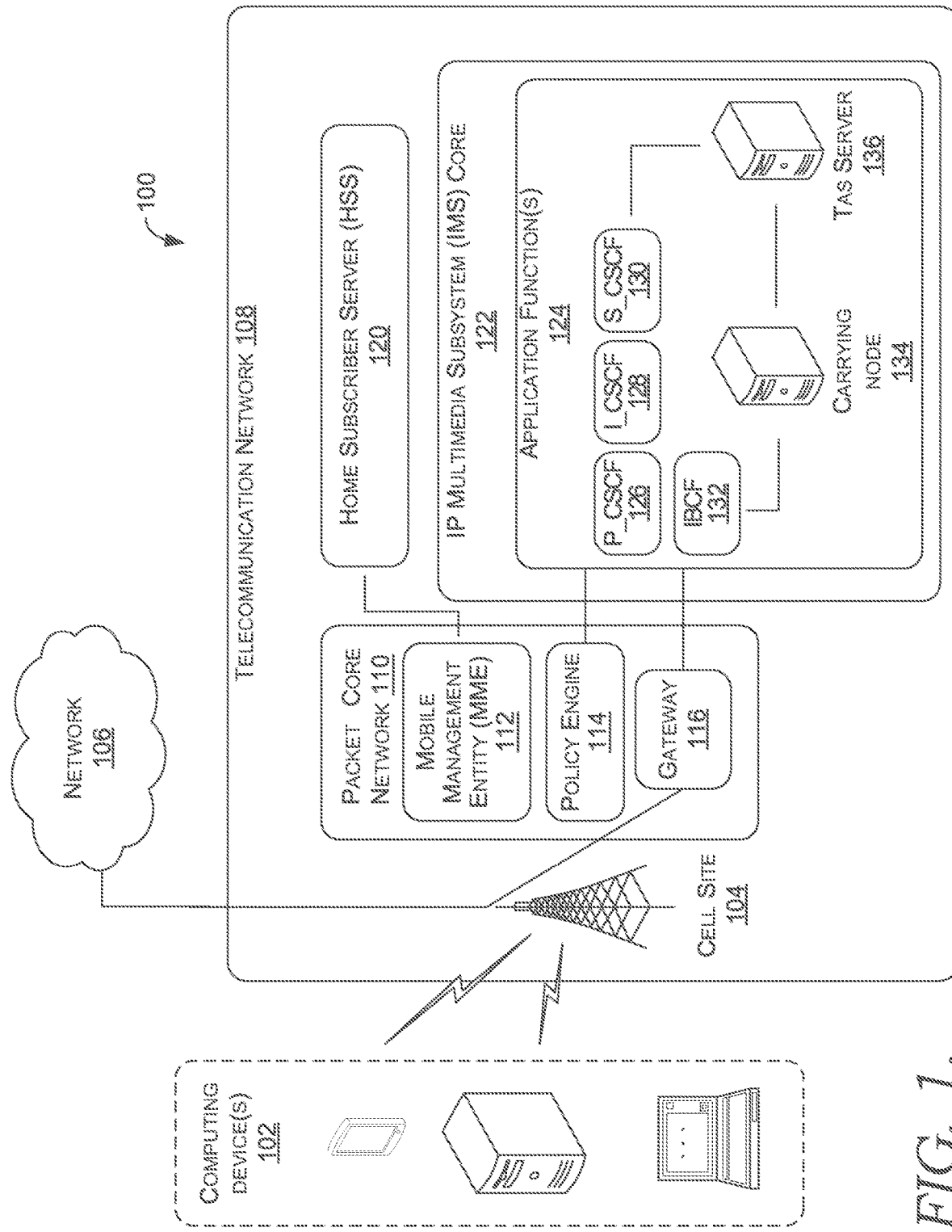
FIG. 1 depicts an example computing environment for operations of an enhanced selective attestation system, in accordance with aspects herein.

The subject matter of embodiments of the invention is described with specificity herein to meet statutory requirements. However, the description itself is not intended to limit the scope of this patent. Rather, the inventor has contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
AOCN Administrative Operating Company Number
CD-ROM Compact Disk Read Only Memory
CDMA Code Division Multiple Access
DVD Digital Versatile Discs
EEPROM Electrically Erasable Programmable Read Only Memory
eNB Evolved Node B
FD-MIMO Full-Dimension Multiple-Input Multiple-Output
gNB Next Generation Node B
GPRS General Packet Radio Service
GSM Global System for Mobile communications
HSS Home Subscriber Server
I-CSCF Interrogating Call Session Control Function
IBCF Interconnection Border Control Function
LTE Long Term Evolution
MIMO Multiple-Input Multiple-Output MME Mobile Management Entity
MSC Mobile Switching Center
MU-MIMO Multi-User Multiple-Input Multiple-Output
NR New Radio
OCN Operating Company Number
P-CSCF Proxy Call Session Control Function
PC Personal Computer
PDA Personal Digital Assistant
PLMN Public Land Mobile Network
PSTN Public Switched Telephone Network
RAM Random Access Memory
RF Radio-Frequency
ROM Read Only Memory
S-CSCF Serving Call Session Control Function
SIP Session Initiation Protocol
SPID Service Provider ID
TAS Telephony Application Server
TDMA Time Division Multiple Access
VoIP Voice Over Internet Protocol In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Further, the term "some" may refer to "one or more." Additionally, an element in the singular may refer to "one or more." The term "combination" (e.g., a combination thereof, combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Additionally, a "computing device," as used herein, is a device that has the capability of using a wireless communications network, and may also be referred to as a "user device," "mobile device," "user equipment," "wireless communication device," or "UE." A computing device, in some aspects, may take on a variety of forms, such as a PC, a laptop computer, a desktop computer, a tablet, a mobile phone, a PDA, a server, or any other device that is capable of communicating with other devices (e.g., by transmitting or receiving a signal) using a wireless communication. A computing device may be, in an embodiment, similar to computing devices described herein with respect to FIGS. 1 and 2. A user device may also be, in another embodiment, similar to user device 700, described herein with respect to FIG. 7.

A computing device may additionally include internet-of-things devices, such as one or more of the following: a sensor, controller (e.g., a lighting controller, a thermostat), appliances (e.g., a smart refrigerator, a smart air conditioner, a smart alarm system), other internet-of-things devices, or combinations thereof. Internet-of-things devices may be stationary, mobile, or both. In some aspects, the user device is associated with a vehicle (e.g., a video system in a car capable of receiving media content stored by a media device in a house when coupled to the media device via a local area network. In some aspects, the user device comprises a medical device, a location monitor, a clock, other wireless communication devices, or a combination thereof.

In aspects, a computing device discussed herein may be configured to communicate using one or more of 4G (e.g., LTE), 5G, 6G, another generation communication system, or a combination thereof. In some aspects, the computing device has a radio that connects with a 4G cell site but is not capable of connecting with a higher generation communication system. In some aspects, the computing device has components to establish a 5G connection with a 5G gNB, and to be served according to 5G over that connection. In some aspects, the computing device may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

Wireless telecommunication services (e.g., the transfer of information without the use of an electrical conductor as the transferring medium) may be provided by one or more telecommunication network providers. Wireless telecommunication services may include, but are not limited to, the transfer of information via radio waves (e.g., Bluetooth®), satellite communication, infrared communication, microwave communication, Wi-Fi, millimeter wave communication, mobile communication, or a combination thereof. Embodiments of the present technology may be used with different wireless telecommunication technologies or standards, including, but not limited to, CDMA 1×Advanced, GPRS, Ev-DO, TDMA, GSM, WiMax technology, LTE, LTE Advanced, other technologies and standards, or a combination thereof.

A network providing the wireless telecommunication services may be a telecommunication network(s), or a portion thereof. A telecommunication network might include an array of devices or components (e.g., one or more cell sites). The network can include multiple networks, and the network can be a network of networks. In embodiments, the network is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a network can connect one or more computing devices to a corresponding immediate service provider for services such as 5G and LTE, for example. In aspects, the network provides wireless telecommunication services comprising one or more of a voice service, a message service (e.g., SMS messages, MMS messages, instant messaging messages, an EMS service messages), a data service, other types of wireless telecommunication services, or a combination thereof. In aspects, the wireless telecommunication services are provided to user devices or corresponding users that are registered or subscribed to a telecommunication service provider to utilize the one or more services. The network can comprise any communication network providing voice, message, or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, another generation network, or a combination thereof.

Components of the network, such as terminals, links, and nodes (as well as other components), can provide connectivity in various implementations. For example, components of the network may include core network nodes, relay devices, integrated access and backhaul nodes, macro eNBs, small cell eNBs, gNBs, relay cell sites, other network components, or a combination thereof. The network may interface with one or more cell sites through one or more wired or wireless backhauls. As such, the one or more cell sites may communicate to devices via the network or directly. Furthermore, user devices can utilize the network to communicate with other devices (e.g., a user device(s), a server(s), etc.) through the one or more cell sites.

As used herein, the term "cell site" (used for providing UEs with access to the telecommunication services) generally refers to one or more cellular base stations, nodes, RRUs control components, and the like (configured to provide a wireless interface between a wired network and a wirelessly connected user device). A cell site may comprise one or more nodes (e.g., eNB, gNB, or other nodes) that are configured to communicate with user devices. In some aspects, the cell site may include one or more band pass filters, radios, antenna arrays, power amplifiers, transmitters/receivers, digital signal processors, control electronics, GPS equipment, and the like. The one or more nodes corresponding to the cell site may comprise one or more of a macro base station, a small cell or femtocell base station, a relay base station, a combination thereof, and so forth. In aspects, the cell site may be configured as FD-MIMO, massive MIMO, MU-MIMO, cooperative MIMO, 3G, 4G, 5G, another generation communication system, or a combination thereof. In addition, the cell site may operate in an extremely high frequency region of the spectrum (e.g., from 30 GHz to 300 GHz), also known as the millimeter band.

Additionally, "attestation" refers to attesting to the validity of originating identification data (e.g., a calling number). For example, a telecommunications provider may authenticate originating identification data and/or destination identification data associated with a telecommunications service (such as authentication of a calling phone number from the originating identification data). Attestation may also include verifying that a calling source is authorized to use the calling number, for example. As another example, the telecommunications provider may determine that the call has originated from a known customer, but that the entire number cannot be verified. Additionally, the telecommunications provider may only be able to verify a known gateway from which the call is transmitted.

A STIR system associated with the telecommunications provider may produce a JSON Web Token that contains originating identification data provided by an SIP User Agent and destination identification data. The destination telecommunications provider may use a public key to decode STIR information to extract the information therein for determining whether to facilitate the telecommunication service associated with the destination identification data. Together, STIR/SHAKEN provides verified information about the originating identification data (e.g., a calling party and the origin of the call). For example, a STIR header may be tagged as authenticated and a caller ID provided to a destination user device may indicate (e.g., via a graphical user interface) that the caller ID provided is verified.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior methods and systems failed to provide enhanced selective attestation. For example, prior methods and systems using attestation do not identify whether destination identification data (e.g., one or more of a prefix including a country code, a national destination code, area codes, other codes, or a combination thereof) from a transmitting device to a destination device corresponds to a country or geographical area other than the country or geographical associated with the wireless communication network corresponding to the transmitting device. Additionally, the prior methods and systems using attestation do not verify that the destination identification data corresponds to data included within a set of permissible destination identification data. Without identifying that the destination identification data corresponds to a country or geographical area other than the country or geographical associated with the wireless communication network corresponding to the transmitting device, handoff between networks corresponding to the transmitting device and the destination device are slower and in some instances may not occur. For example, the network associated with the destination device may not properly recognize the identity of the transmitting device associated with the network that is associated with the differing country or geographical area.

Further, the prior methods and systems using attestation do not verify that destination identification data corresponds to a Service Provider ID included within a set of permissible Service Provider IDs. For example, by verifying the destination identification data using a Service Provider ID, rather than an AOCN or OCN associated with a wireless telecommunication network of the destination device, attestation may be performed faster than the prior methods and systems using the higher volumes of trusted AOCNs or OCNs to compare with the associated information of the destination device. As such, handoff (in prior methods and systems using attestation) between networks corresponding to the transmitting device and the destination device are slower.

The systems and methods provided herein can alleviate the problems discussed above. For instance, in aspects, embodiments disclosed herein provide for identifying whether destination identification data (e.g., one or more of a prefix including a country code, a national destination code, other codes, or a combination thereof) from a transmitting device to a destination device corresponds to a country or geographical area other than the country or geographical associated with the wireless communication network corresponding to the transmitting device. Additionally, the embodiments disclosed herein provide for verify that the destination identification data corresponds to data included within a set of permissible destination identification data. Further, the embodiments disclosed herein provide for verifying that destination identification data corresponds to a Service Provider ID included within a set of permissible Service Provider IDs. As such, the embodiments disclosed herein improve attestation performance and improve hand-off between networks corresponding to the transmitting device and the destination device.

Accordingly, in one aspect, a system is provided for automated delivery schedules for enhanced selective attestation. The system comprises one or more processors and computer memory storing computer-usable instructions that, when executed by the one or more processors, perform operations. The operations comprise receiving, from a wireless communication network, a request to establish a communication session with a computing device, the request being associated with destination identification data including a prefix. A determination is made as to whether the prefix corresponds to a country other than the country associated with the wireless communication network. Based on the determining, the operations comprise: verifying that the destination identification data corresponds to data included within a set of permissible destination identification data, or verifying that the destination identification data corresponds to a Service Provider ID included within a set of permissible Service Provider IDs. Attestation is performed in response to verifying the destination identification data using the set of permissible destination identification data or the set of permissible Service Provider IDs.

In another aspect, a method is provided for enhanced selective attestation. The method comprises receiving, from a wireless communication network, a request to establish a communication session with a computing device, the request being associated with destination identification data. Additionally, the method determines whether the destination identification data corresponds to a geographical area other than the geographical area associated with the wireless communication network. Upon determining that the destination identification data corresponds to the geographical area other than the geographical area associated with the wireless communication network, the method verifies that the destination identification data corresponds to data included within a set of permissible destination identification data. Attestation is performed in response to verifying that the destination identification data corresponds to the data included within the set of permissible destination identification data.

Another aspect provides for non-transitory computer-readable media having computer-usable instructions embodied thereon that, when executed by a processor, perform operations for enhanced selective attestation. The operations comprise receiving, from a wireless communication network via a first computing device, a request to establish a communication session with a second computing device, the request and the second computing device being associated with destination identification data. A determination is made as to whether the destination identification data is associated with a geographical area other than the geographical area associated with the wireless communication network. Based on the determining, the method comprises: verifying that the destination identification data corresponds to data included within a set of permissible destination identification data upon determining that the destination identification data is associated with the geographical area other than the geographical area associated with the wireless communication network, or verifying that the destination identification data corresponds to a Service Provider ID included within a set of permissible Service Provider IDs upon determining that the destination identification data is associated with the geographical area associated with the wireless communication network. Attestation is performed in response to verifying the destination identification data.

Turning now to FIG. 1, example environment 100 comprises one or more computing devices 102; cell site 104 providing a network 106; telecommunication network 108 corresponding to a provider; packet core network 110 comprising MME 112, policy engine 114, and gateway 116; HSS 120, IMS core 122; and application functions 124. Application functions 124 may comprise P-CSCF 126, I-CSCF 128, S-CSCF 130, IBCF 132, carrying node 134, and TAS server 136, for example.

Beginning with the one or more computing devices 102, a computing device may take on a variety of forms including: a PC, a user device, a smart phone, a smart watch, a laptop computer, a desktop computer, a mobile phone, a mobile device, a tablet computer, a wearable computer, a PDA, a server, a CD player, an MP3 player, a GPS device, a video player, a handheld communications device, a workstation, a router, a hotspot, and any combination of these delineated devices, or any other device (such as the computing device 700 in FIG. 7) that communicates via wireless communications to interact with a public or private network.

The one or more computing devices 102 may be configured to communicate by way of one or more transmissions with cell site 104 using 3G, 4G, 5G, another generation, or a combination thereof. A computing device 102 may communicate with one or more of other computing devices, with network 106, with telecommunication network 108 corresponding to a provider, another telecommunication network corresponding to the provider or another provider, or a combination thereof. In some aspects, the one or more computing devices 102 may be an edge device configured to send and receive data (e.g., configuration information) over the telecommunication network 108. For example, an edge device may also access a cloud computing service and interact with a web browser application associated with the telecommunication network 108. An edge device may also implement peer-to-peer communications. The one or more computing devices 102 may be configured to communicate with other devices, perform data collection, and perform machine learning. In aspects, an edge device is on the edge of a large distributed network of data-connected devices.

In some embodiments, the one or more computing devices 102 is an internet-of-things device. An internet-of-things device may include a recording device (e.g., one or more digital cameras, one or more video cameras, one or more audio recorders, or a combination thereof), a city management device (e.g., one or more parking sensors, one or more traffic sensors, one or more water quality devices, or a combination thereof), a vehicle (e.g., a car, a truck, an airplane, a boat, a jet ski), a body sensor (e.g., one or more vital sign sensors, one or more pedometers), an environmental sensor (e.g., one or more weather sensors, one or more pollution sensors, one or more air quality sensors), a wearable computing device (e.g., a smart watch, glasses, or clothes), personal computing devices, a home device (e.g., one or more appliances, one or more thermostats, one or more light systems, one or more security systems), an advertising device (e.g., one or more billboards, one or more information kiosks), and so forth.

As shown in FIG. 1, the one or more computing devices 102 may wirelessly communicate with cell site 104 using one or more of FD-MIMO, massive MIMO, MU-MIMO, cooperative MIMO, 3G, 4G, 5G, another generation communication system, 802.11, or millimeter waves. Additionally, other wireless communication protocols may be utilized in conjunction with aspects described herein. In some aspects, an eNB or gNB corresponding to cell site 104 may comprise a macro base station, a small cell or femto base station, a relay, and so forth. As discussed herein, cell site 104 is deployed in a network to control and facilitate, via one or more antenna arrays, the broadcast, transmission, synchronization, and receipt of one or more wireless signals in order to communicate with, verify, authenticate, and provide wireless communications service coverage to one or more computing devices or other types of devices that request to join or are connected to the network.

The telecommunication network 108 may include one or more telecommunication networks (or a portion of a network or a network of networks), such as local area networks, wide area networks, the Internet, other remote networks, or a combination thereof to transfer data to or for the one or more computing devices 102. Components of the telecommunication network 108 may comprise one or more wired or wireless programmable devices, such as cellular networks (e.g., a Global System for Mobile communications), IEEE 802.11 networks, other suitable radio-based networks, or a combination thereof. The telecommunication network 108 components may also include one or more network devices, such as servers, routers, network switches, other network hardware devices configured to transport data over the network, or a combination thereof.

In aspects, the telecommunication network 108 is part of a STIR/SHAKEN framework (e.g., based at least in part on the AOCN or OCN of the destination network). STIR/SHAKEN, for example, is a framework of interconnected standards. The STIR/SHAKEN acronyms are for the Secure Telephone Identity Revisited and Signature-based Handling of Asserted Information Using toKENs standards. STIR/SHAKEN frameworks provide for calls traveling through interconnected phone networks to have their caller ID "signed" as legitimate by one or more originating carriers and validated by other carriers before reaching a destination computing device. For example, the STIR/SHAKEN framework digitally validates a handoff of a phone call passing through a complex web of networks, allowing the provider of the destination computing device to verify that the phone call is in fact from the telephone number associated with the transmitting computing device.

In some aspects, the carrying node 134 facilitates the telecommunication network 108 (e.g., the telecommunication network that receives a request to establish a communication session with a destination computing device) in verifying the identity of an originating computing device (e.g., the computing device transmitting the request to establish the communication session with the destination computing device) pursuant to the STIR/SHAKEN framework. For example, carrying node 134 may be configured to selectively determine or verify whether a destination telecommunication network associated with the destination computing device is part of a STIR/SHAKEN framework (e.g., by using the AOCN, SPID, or OCN of the destination telecommunication network).

In some embodiments, the request received by the telecommunication network 108 is associated with originating identification data and destination identification data. For example, the originating identification data and the destination identification data may each comprise one or more, or a combination, of the following:

(1) A Country Code for geographic areas. The Country Code for geographic areas may include the combination of one, two or three digits identifying a specific country, countries in an integrated numbering plan, or a specific geographic area.

(2) A Country Code for global services. In aspects, the Country Code for global services may include a 3-digit country code used to identify a global service.

(3) A Country Code for groups of countries. For example, the Country Code for groups of countries may include a shared 3-digit country code used in combination with a group identification code to identify a group of countries.

(4) A Country Code for networks. For example, a Country Code for networks may include a shared 3-digit country code used in combination with an identification code to identify an international Network.

(5) A Country Code for trials. For example, a Country Code for networks may include a shared 3-digit country code used in combination with a 3-digit trial identification code to identify a trial.

(6) A Destination Network Code. For example, a Destination Network code may include an optional code field within an international ITU-T E.164-numbering plan, which identifies the destination network serving the destination subscriber associated with the destination computing device. In some aspects, the Destination Network code allows for the selection of the destination network associated with a national destination code. In some instances, the Destination Network code can be combined with a trunk code to form the national destination code. In some aspects, the Destination Network code is a decimal digit or a combination of decimal digits (not including a prefix).

(7) A Global Service. For example, the Global Service may include a service defined by the International Telecommunication Union-Telecommunication (an organization referred to as "ITU-T" that coordinates standards for telecommunications and Information Communication Technology, such as X.509 for cybersecurity). In some aspects, the Global Service is provisioned on a public switched network, to which ITU-T has assigned a specific country code to enable the provision of that international service between two or more countries or integrated numbering plans.

(8) A Global Subscriber Number. For example, the Global Subscriber Number may include a portion of the international ITU-T E.164-number that identifies a subscriber for a particular global service.

(9) A Group Identification Code. For example, the Group Identification Code may include a single-digit identification code assigned to a group of countries.

(10) A Group Identification Code Administrator. For example, the Group Identification Code Administrator is an organization entrusted by the assignee with the administration and management of the numbering resources behind a specific Country Code+Group Identification Code.

(11) Groups of Countries. For example, several ITU- or UN-recognized countries share the same Country Code+Group Identification Code.

(12) Identification Code. The Identification Code may involve a code subsequent to a country code for networks that uniquely identify an international network.

(13) Network Internationally. For example, the Network Internationally may involve one or more interconnected physical nodes and one or more operational systems operated and maintained by one or more Recognized Operating Agencies to provide public telecommunications services. In some aspects, private networks are not included in Network Internationally.

(14) Trial Identification Codes. The Trial Identification Codes may include a three-digit identification code that uniquely identifies one or more international public correspondence service trial participants.

(15) Trials. For example, a Trial may include a temporary implementation of a proposed new international public correspondence service for the purpose of determining its technical, operational, or business viability.

In embodiments, gateway 116 interfaces with the network 106 for establishing the communication session associated with the request from the transmitting computing device. The gateway 116 may include one or more servers and components configured to provide connectivity between the packet core network 110 and the network 106. For example, the gateway 116 is configured as a point of receiving and transmitting network traffic for the telecommunication network 108.

The packet core network 110 may include MME 112, which may perform signal functions in the packet core network 110. The MME 112 may transmit and receive signaling information (such as the destination identification data) to set up the communication session between the transmitting computing device and the destination computing device. The MME 112 may comprise security protocols for authentication and authorization associated with setting up the communication session. Further, the packet core network 110 may include policy engine 114, which detects communication service data flows and provides parameters for policy control or charging control. The MME 112 may also access an HSS 120 (e.g., subscriber database), the HSS providing details associated with subscribers to the telecommunication network 108. By accessing the HSS 120, the telecommunication network 108 provider can verify an identity of the transmitting computing device or the destination computing device, as well as subscriber details of each. In aspects, the originating identification data, the destination identification data, or a combination thereof, is used for verifying the transmitting computing device or the destination computing device.

In aspects, the IMS core 122 includes the P-CSCF 126 for accepting requests and serving the requests (from the transmitting computing device) internally or forwarding the requests to the I-CSCF 128 and the S-CSCF 130. In some embodiments, the S-CSCF 130 performs as an SIP registrar or an SIP redirect server. In some embodiments, the S-CSCF 130 processes a location registration of the originating computing device or the destination computing device and provides authentication, call routing, and processing. In some embodiments, the S-CSCF 130 is selected by the I-CSCF 128 for serving an initial SIP request (e.g., when the transmitting computing device does not know which S-CSCF should receive the request). Further, in some aspects, the IBCF 132 is a network element deployed to protect the telecommunication network 108.

For example, the IBCF 132 may provide the telecommunication network 108 with measurements, access control, and data conversion facilities of communications received at an edge of the network. Additionally, in some aspects, the TAS server 136 is configured to emulate calling features traditionally provided by a Public Switched Telephone Network or a legacy PLMN (e.g., 3G), such as call forwarding, voicemail, conference bridges, other calling features, or combinations thereof. The TAS server 136 may also establish a VoIP communication between the transmitting computing device and the destination computing device. In aspects, TAS server 136 may insert one or more attestation parameters into an SIP INVITE message associated with the request generated by the transmitting computing device (e.g., according to a STIR/SHAKEN framework).

The carrying node 134 may be communicatively coupled with one or more of the P-CSCF 126, the I-CSCF 128, the S-CSCF 130, the IBCF 132, the TAS server 136, another component, or a combination thereof. In aspects, the carrying node 134 may detect receipt of an SIP INVITE message associated with the request at the TAS server 136. Continuing the example, the carrying node 134 may retrieve an AOCN or OCN of the destination network associated with the destination computing device and further determines whether the destination network is part of the STIR/SHAKEN framework. In some aspects, the carrying node 134 may determine, in response to receiving the request for the communication session, whether the destination identification data corresponds to a geographical area other than the geographical area associated with the wireless communication network that received the request. For example, the geographical area, other than the geographical area associated with the wireless communication network, may include a different country or a territory of the same country.

The carrying node 134 may facilitate one or more of the P-CSCF 126, the I-CSCF 128, the S-CSCF 130, the IBCF 132, the TAS server 136, another component, or a combination thereof, in response to determining whether the destination identification data corresponds to the geographical area other than the geographical area associated with the wireless communication network that received the request. As such, the carrying node 134 may verify that the destination identification data corresponds to data included within a set of permissible destination identification data (e.g., the set of permissible destination identification data comprising particular combinations of country codes and national destination codes, the combinations each being associated with a particular carrier of a plurality of carriers). In some embodiments, the carrying node 134 verifies that the destination identification data corresponds to a Service Provider ID included within a set of permissible Service Provider IDs upon determining that the destination identification data corresponds to the geographical area associated with the wireless communication network.

Based on verifying the destination identification data, the carrying node 134 may generate an attestation claim in Jason Web Token (JWT) or another encoding format for insertion into the SIP INVITE message associated with the request. For example, the TAS 136 may interact with the I-CSCF 128 and the S-CSCF 130 to route the modified SIP INVITE message to the destination telecommunication network associated with the destination computing device. For example, in some embodiments, attestation is performed in response to verifying that the destination identification data corresponds to the Service Provider ID included within the set of permissible Service Provider IDs. In some embodiments, attestation is performed in response to verifying that the destination identification data corresponds to data included within a set of permissible destination identification data. In some embodiments, the attestation is performed in response to determining that the OCN, AOCN, or SPID is not within an impermissible set of OCNs, an impermissible set of AOCNs, or an impermissible set of SPIDs. The digitally signed attestation claim generated may be transmitted to the telecommunication network 108 for delivery to the destination telecommunication network.

While the carrying node 134 is illustrated as part of the IMS core 122, other embodiments may include a remote carrying node executable on a separate server or computing device, by one or more of the P-CSCF 126, the I-CSCF 128, the S-CSCF 130, the IBCF 132, the TAS 136, another component, or a combination thereof.

In aspects, the communication session may be initiated at telecommunication network 108 in response to the request from one or more computing devices 102. The telecommunication network 108 may relay the request and a communication through the network 106 to the destination network and the destination computing device. In some embodiments, the telecommunication network 108 (e.g., a network corresponding to the STIR/SHAKEN framework) may provide attestation information for the identity of the transmitting computing device. Attestation information may be used for initiating the communication session between the computing devices.

In some embodiments, telecommunication network 108 initiates a request with the destination network for the AOCN or OCN associated with the destination network. As an example, the telecommunication network 108 may determine that the destination network is or is not part of the STIR/SHAKEN framework. In some aspects, upon determining that the destination network is part of the STIR/SHAKEN framework and that the destination identification data from the request from the transmitting computing device corresponds to a Service Provider ID included within a set of permissible Service Provider IDs, the attestation is performed. For example, the I-CSCF 128 or the S-CSCF 130 may initiate the request to the destination network for the AOCN or OCN. As another example, the IBCF 132 may initiate the request to the destination network.

In some aspects, carrying node 134 interrogates one or more databases associated with the destination network, wherein the destination identification data acts as an identifier for verifying the destination network based on the set of permissible destination identification data or the set of permissible Service Provider IDs. As one example, the destination identification data may be "whitelisted" as being associated with a permissible network or a permissible destination computing device. In aspects, the permissible destination network or the permissible destination computing device is associated with the geographical area other than the geographical area associated with the telecommunication network 108. In aspects, the permissible destination network or the permissible destination computing device is associated with the geographical area of the telecommunication network 108. In embodiments, if the destination network or the destination computing device associated with the destination identification data is not identified as the permissible destination network or the permissible destination computing device, the attestation request may be rejected.

In some aspects, carrying node 134 causes a digitally signed attestation claim associated with the destination identification data to be generated and transmitted to the IBCF 132 for delivery to the destination network in response to verifying the destination identification data. In some aspects, the attestation claim is part of a JWT-encoded token represented as an SIP identity header in the SIP INVITE.

Figure 2:
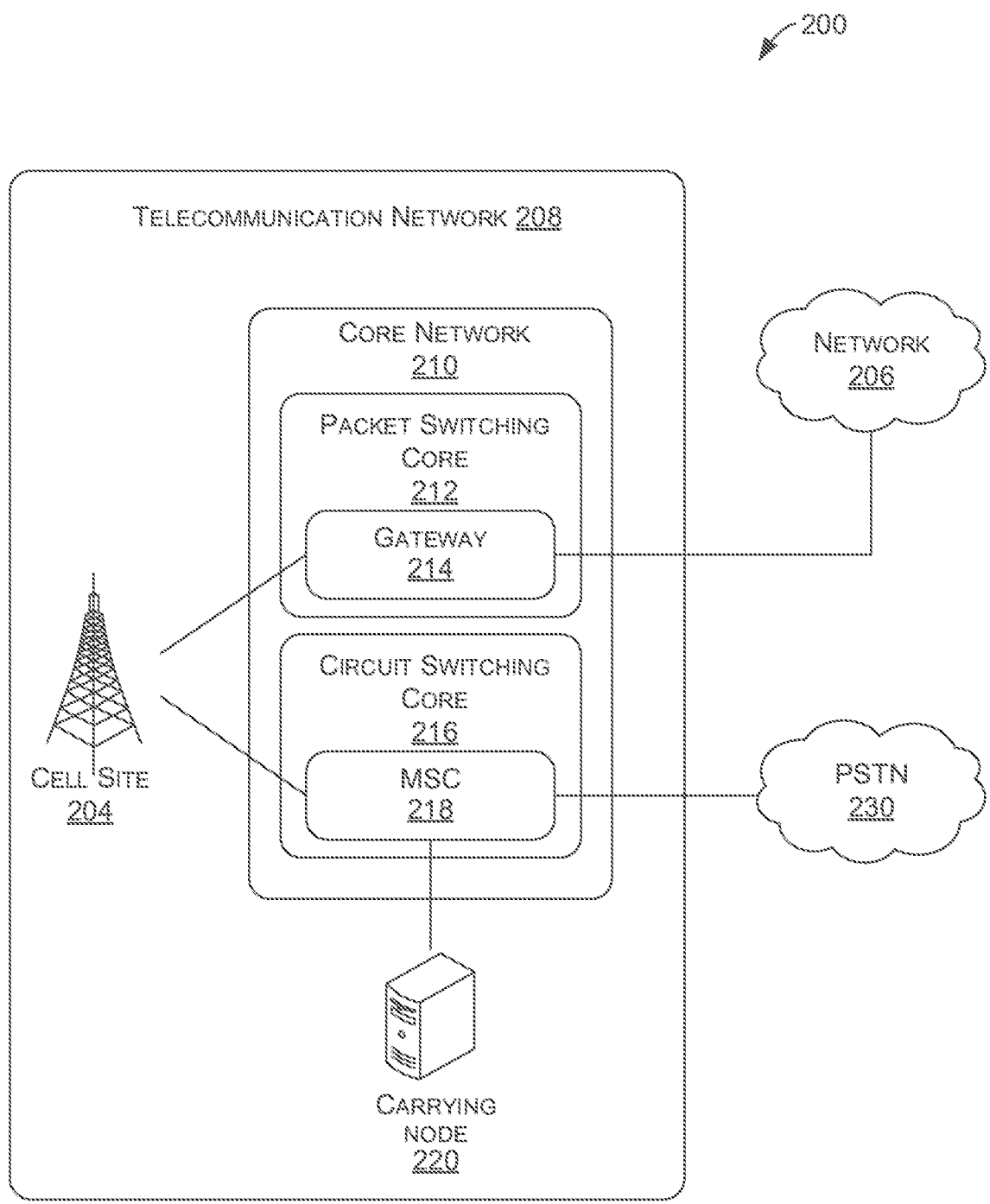
FIG. 2 depicts an example computing environment for operations of an enhanced selective attestation system based in part on destination identification data associated with a destination computing device, in accordance with aspects herein.

FIG. 2 depicts an example computing environment 200 comprising cell site 204, network 206, telecommunication network 208, core network 210 comprising packet switching core 212 including gateway 214 and circuit switching core 216 including MSC 218, carrying node 220 and PSTN 230. The example computing environment 200 may facilitate one or more operations of the carrying node 220 within the telecommunication network 208.

In aspects, the telecommunication network 208 corresponds to a computing device transmitting a request for a communication session with a destination computing device. In some aspects, the telecommunication network 208 corresponds to a destination network associated with the destination computing device. The telecommunication network 208, in some embodiments, corresponds to one or more of a 3G, 4G, 5G, other generation network, or a combination thereof. For example, the core network 210 may include one or more of 3G domain components, 4G domain components, 5G domain components, other generation domain components, or a combination thereof. The one or more domain components may support data traffic and voice traffic associated with one or more of the 3G, 4G, 5G, other generation network, or a combination thereof.

In aspects, the network 206 may be routed through one or more gateways 214 of packet switching core 212 (e.g., a 3G PS core). Further, the MSC 218 of circuit switching core 216 may be configured to control network switching subsystem(s) of the telecommunication network 208. For example, the network switching subsystem(s) may carry out call out and mobility management functions for one or more computing devices. Further, the MSC 218 may interact with carrying node 220. In some aspects, the carrying node 220 is alternatively remotely executable on a server or computing device separate from the telecommunication network 208.

Figure 3:
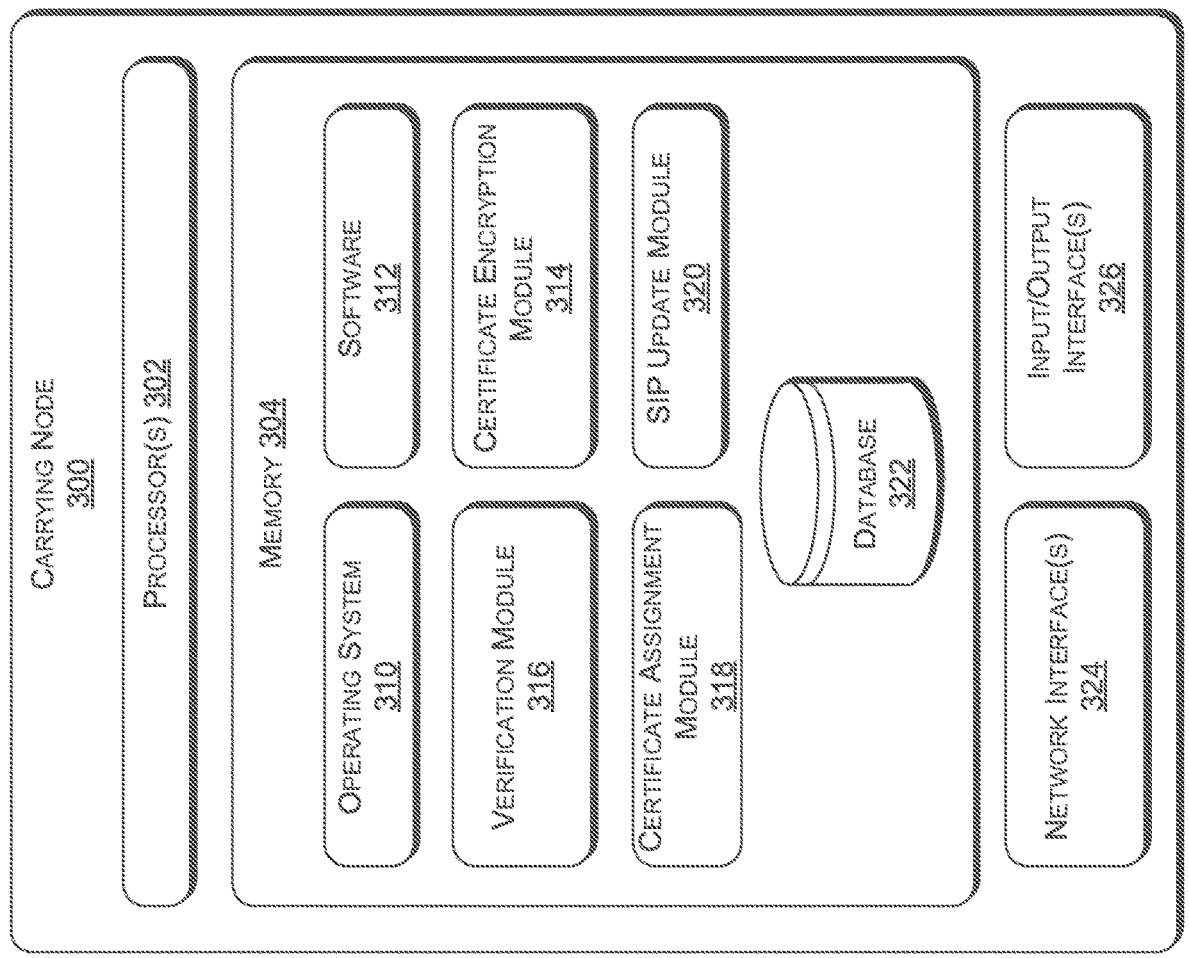
FIG. 3 depicts an example block diagram of various components of a call attestation carrying node, in accordance with aspects herein.

FIG. 3 illustrates example carrying node 300. Example carrying node 300 may comprise, for example, one or more processors 302, a memory 304 comprising an operating systems 310, software 312, certificate encryption module 314, verification module 316, certificate assignment module 318, SIP update module 320, and database 322. The example carrying node 300 may also include one or more network interfaces 324 and one or more I/O interfaces 326.

Carrying node 300 may perform carrying node functions comprising, for example, workloads and workload balancing, processes, and so forth. The one or more processors 302 may be a microprocessor, a microcontroller, a graphics processor, a coprocessor, a field programmable gate array, a programmable logic device, a signal processor, or any other circuit suitable for processing data via the carrying node 300. In aspects, the one or more processors 302 and the memory 304 may implement the operating system 310 and the software 312, as well as one or more applications for executing the carrying node functions. The memory 304 may further include non-transitory computer-readable media (e.g., volatile or nonvolatile, removable or non-removable). Some examples of computer-readable media may include double data rate memory, other dynamic random access memory, High Bandwidth Memory, Hybrid memory Cube memory, 3D-stacked memory, static random access memory, or other memory comprised of one or more memory circuit.

The certificate encryption module 314 may encrypt or decrypt (e.g., using an encryption key stored on database 322 or another trusted database) an attestation claim with a digital signature. In some aspects, the attestation claim with the digital signature may include one or more of an indication of the AOCN or OCN, destination identification data, originating identification data, or a combination thereof. Additionally, the certificate encryption module 314 may rely on an encryption algorithm associated with, for example, one or more of a Data Encryption Standard, Triplets, one-way asymmetric encryption, Advanced Encryption Standard, another custom encryption algorithm, or a combination thereof. In some aspects, encryption and decryption may rely on private or public block chains. In some aspects, the encryption algorithm relies on a consensus algorithm (e.g., proof of work, proof of stake, proof of authority Byzantine Fault Tolerance).

The verification module 316 may manage a record of permissible AOCNs and OCNs, permissible destination identification data (e.g., permissible country code and national destination code combinations), permissible Service Provider IDs. In aspects, the verification module 316 maintains a dynamic database that compares one or more destination identification data of the destination computing device to determine whether to perform attestation. For example, if the verification module 316 verifies the destination identification data, the destination network, or the destination computing device, the attestation may be performed and an attestation claim with a digital signature may be generated and incorporated into an SIP INVITE message. For example, the certificate assignment module 318 may generate the attestation claim with a digital signature and, in some embodiments, encrypt the attestation claim with the digital signature using the certificate encryption module 314.

The SIP update module 320 may transmit an instruction (e.g., via a certificate update file or instruction) to cause the attestation claim with the digital signature to be included in the SIP INVITE message of a wireless communication. The instruction may comprise, for example, computer readable code executed at a telecommunications network. The attestation claim with the digital signature may be added to a header of the SIP INVITE message of the wireless communication in the outgoing SIP INVITE message towards the destination network.

The network interface 324 may facilitated communicating over wireless telecommunication networks. Further, the network interface 324 may include wired communication components, such as an Ethernet port, a Universal Serial Bus, a wired network adapter, (e.g., an Ethernet adapter or a Token Ring adapter). Additionally, the I/O interface 326 may include I/O port(s) and I/O interface(s), described below with respect to FIG. 7.

Figure 4:
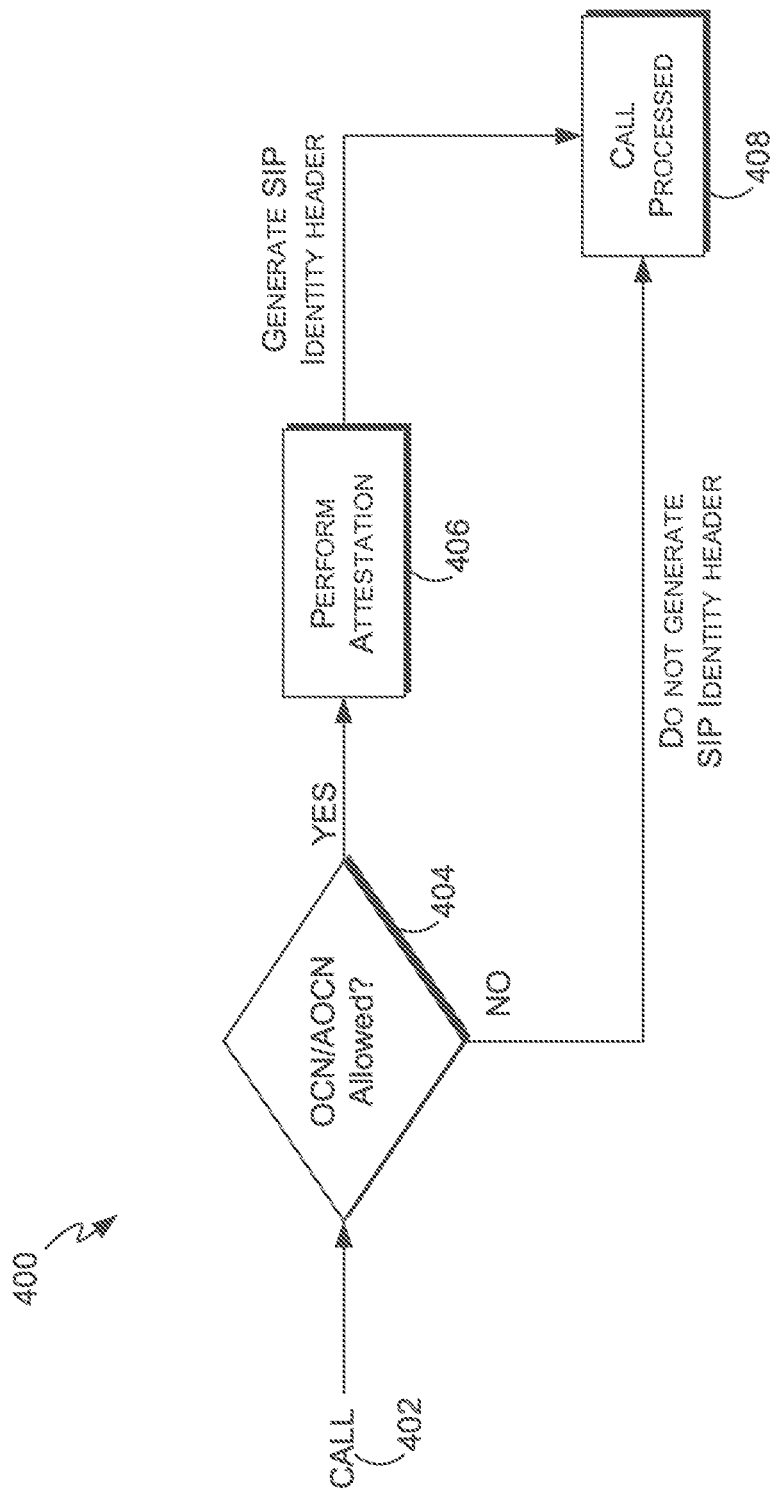
FIG. 4 illustrates an example flow diagram for enhanced selective attestation, in accordance with aspects herein.

FIG. 4 depicts example flow diagram 400 illustrating, at a high level, the prior methods and systems that provide selective attestation (rather than enhanced selective attestation). For example, at 402, a call is received and a determination is made at 404 as to whether an OCN or AOCN is allowed. If it is allowed, at 406, attestation is performed and an SIP identity header is generated for processing the call at 408. If the OCN or AOCN is not allowed, then the SIP identity header is not generated before the call is processed at 408.

Figure 5:
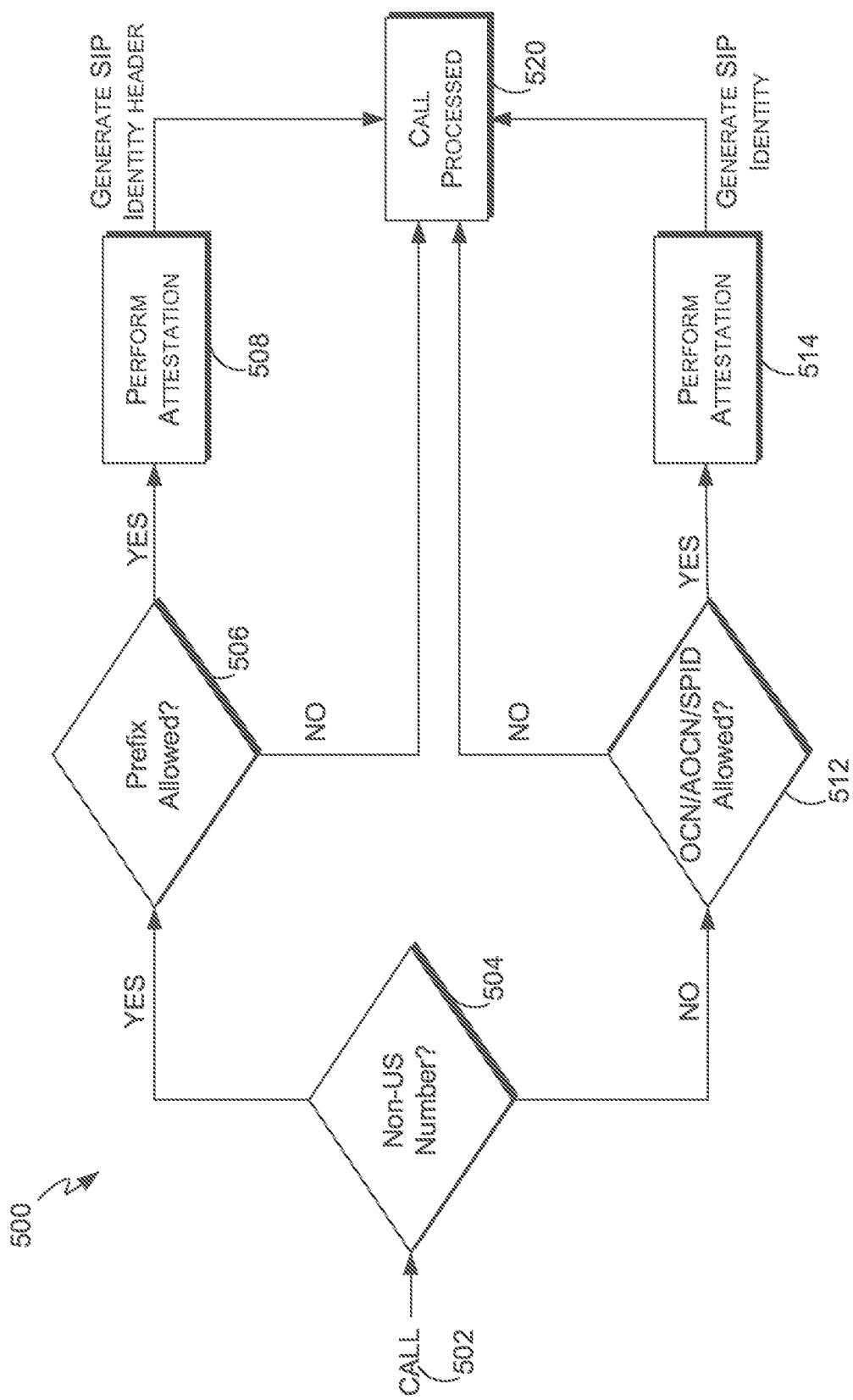
FIG. 5 illustrates another example flow diagram for enhanced selective attestation, in accordance with aspects herein.

FIG. 5 depicts example flow diagram 500 illustrating an embodiment for enhanced selective attestation. At 502, a transmitting computing device initiates a request (e.g., a call) to establish a communication session with a destination computing device. The request and the destination computing device may be associated with destination identification data, which may be used for identifying whether the destination computing device is associated with a US-number or a non-US number (e.g., a Canadian number). As such, at 504, a determination is made as to whether the destination identification data is associated with a geographical area other than the geographical area associated with the wireless communication network. For example, a prefix of the destination identification data may correspond to a country other than the country associated with the wireless communication network that received the request from a subscribing transmitting computing device.

The prefix, in some embodiments, may comprise a country code (e.g., for geographic areas, global services, or groups of countries). In some aspects, the prefix includes a combination of the country code and a national destination code, for example. In some aspects, the prefix includes a combination of the country code and a National Destination Code, Destination Network code, a global subscriber number, an identification code, or a Group Identification Code, for example. If the destination identification data is associated with a geographical area other than the geographical area associated with the wireless communication network, then at 506, a determination is made as to whether the prefix is allowed.

For example, the destination identification data may be compared to a set of permissible destination identification data (e.g., stored at one or more databases and comprising permissible prefixes). For instance, Table 1 below is an example table for whitelisting/blacklisting prefixes, which can implement either an exact match or a best match. Example Table 1 below includes a best match implementation:

TABLE 1

| PREFIX | Country | Action |
| --- | --- | --- |
| +1403 | Canada | Allow Attestation |
| +1613 | Canada | Disallow Attestation |
| +1340 | US Virgin Islands | Allow Attestation |
| +63919 | Philippines | Allow Attestation |
| +63 | Philippines | Disallow Attestation |

At 508, upon determining that the prefix is allowed (e.g., using an exact match or a best match implementation), attestation is performed. In aspects, an SIP identity header is generated (e.g., for processing a call or other communication session) such that the communication session may be processed at 520. If the prefix is not allowed at 508, then the SIP identity header is not generated, and the call may be processed without the SIP identity header at 520.

At 512, if it is determined at step 504 that the destination identification data is associated with the geographical area of the wireless communication network receiving the call at 502, then the destination identification data is compared to a set of permissible Service Provider IDs, a set of permissible AOCNs, a set of permissible OCNs, or a combination thereof. By comparing the destination identification data to the set of permissible Service Provider IDs, rather than solely looking up an AOCN or OCN associated with a wireless telecommunication network of the destination computing device, attestation may be performed faster than the prior methods and systems that use larger numbers of trusted AOCNs or OCNs.

To illustrate, example Table 2 depicted below provides a list of Service Provider IDs and associated OCNs: for particular telephone numbers.

TABLE 2

| Telephone Number | SPID | SP Name | OCN | OCN Name |
|---|---|---|---|---|
| 770-310-XXXX | 6529 | Provider A US: 6529 - SVR/2 | 7473 | POWERTEL ATLANTA LICENSES, INC. |
| 810-394-XXXX | 6529 | Provider A US: 6529 - SVR/2 | 2964 | OMNIPOINT COMMUNICATIONS MIDWEST OPERATIONS, LLC |
| 904-887-XXXX | 6529 | Provider A US: 6529 - SVR/2 | 7472 | POWERTEL JACKSONVILLE LICENSES, INC. |
| 256-468-XXXX | 6529 | Provider A US: 6529 - SVR/2 | 7475 | POWERTEL BIRMINGHAM LICENSES, INC. |
| 202-468-XXXX | 6529 | Provider A US: 6529 - SVR/2 | 6855 | OMNIPOINT COMMUNICATIONS CAP OPERATIONS, LLC |
| 205-427-XXXX | 6529 | Provider A US: 6529 - SVR/2 | 7475 | POWERTEL BIRMINGHAM LICENSES, INC. |

By comparing the destination identification data to the set of permissible OCN/AOCN/SPIDs, handoff (compared to prior methods and systems using attestation) between networks corresponding to the transmitting device and the destination device is faster and more efficient, as well as trusted and secure. As such, if the Service Provider ID of the destination identification data is within the set of permissible Service Provider IDs, then attestation is performed at 514. Also, if the OCN or AOCN of the destination identification data is within the set of permissible OCNs or the set of permissible AOCNs, then attestation is performed at 514. In some aspects, if the SPID, OCN, or AOCN is not within a set of impermissible OCN/AOCN/SPIDs, then the attestation may be performed at 514. In aspects, an SIP identity header is generated (e.g., for processing a call or other communication session) such that the communication session may be processed at 520.

If the Service Provider ID of the destination identification data is not within the set of permissible Service Provider IDs at 512, then the SIP identity header is not generated, and the call may be processed without the SIP identity header at 520 (or the call may not be processed). Additionally, if the AOCN or the OCN is not within the set of permissible AOCNs or the set of permissible OCNs at 512, then the SIP identity header is not generated, and the call may be processed without the SIP identity header at 520 (or the call may not be processed). In some aspects, if the OCN/AOCN/SPID is within a set of impermissible OCN/AOCN/SPIDs, then the call may be processed without the SIP identity header at 520 (or the call may not be processed).

Figure 6:
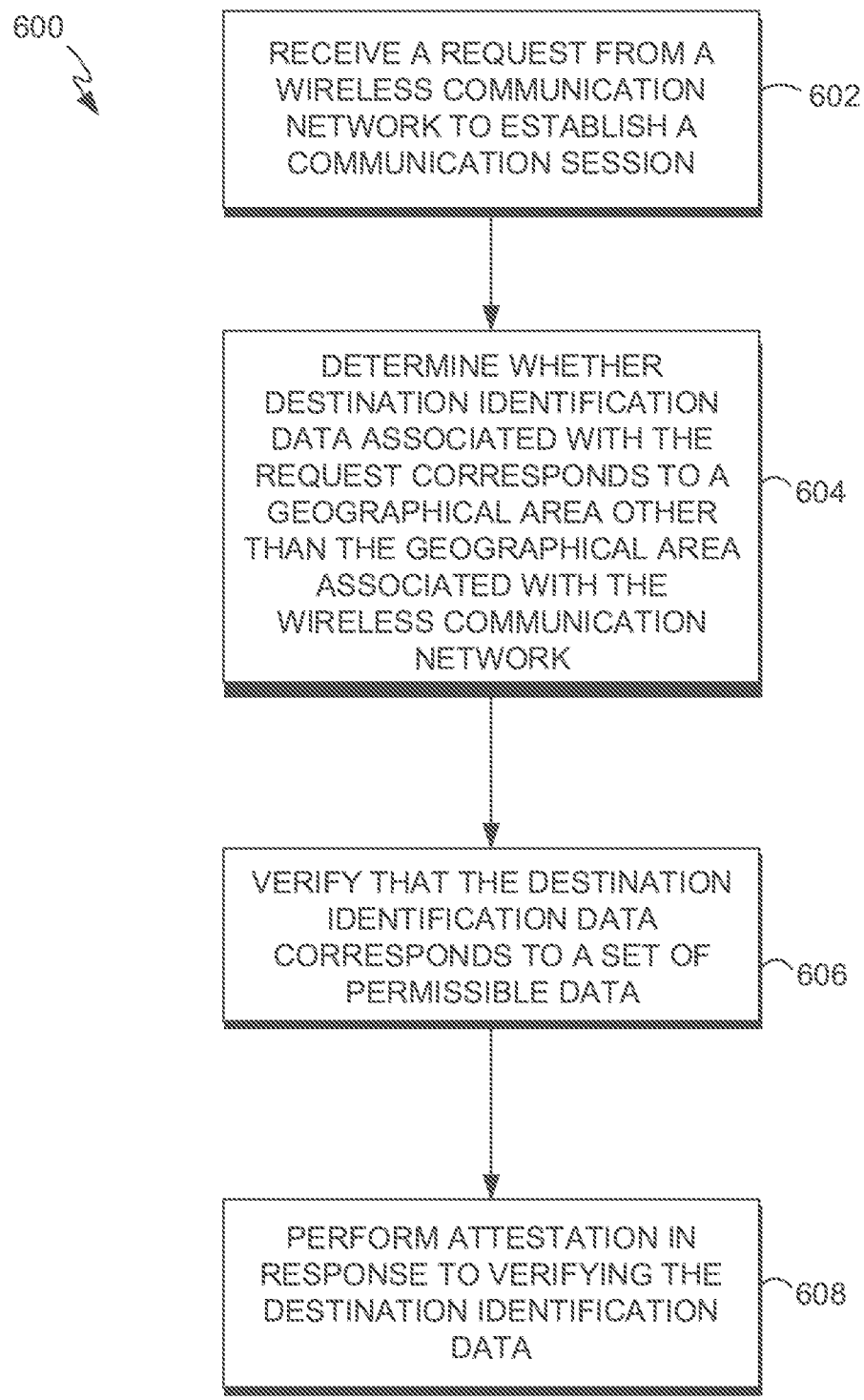
FIG. 6 illustrates yet another example flow diagram for enhanced selective attestation, in accordance with aspects herein.

Turning to FIG. 6, a flow diagram of example method 600 for enhanced selective attestation is provided. At 602, a request is received from a wireless communication network to establish a communication session. For example, the request may be for a communication session with a computing device (or a destination device). The request may be an SIP INVITE message, such as a signaling protocol that enables VoIP by defining one or more messages to send between one or more endpoints and managing one or more actual elements of a call, for example. In some embodiments, the SIP INVITE message corresponds to a call request configured to initiate a dialog for establishing a voice communication, such as a VoIP communication, between at least two user devices. The SIP INVITE message, in some embodiments, may include a P-asserted identity header conveying an identity of the device transmitting the SIP INVITE message within a trusted network. For example, the P-asserted identity header within the trusted network corresponds to an agreement on one or more requirements for its use via the trusted network. Additionally, the trusted network may correspond to a STIR/SHAKEN framework providing end-to-end architecture for authentication and assertion of a telephone identity. Additionally, the request may be associated with destination identification data.

As such, at 604, a determination is made as to whether the destination identification data is associated with a geographical area other than the geographical area associated with the wireless communication network. For example, the geographical area associated with the wireless communication network may, in some aspects, correspond to a first country; and the geographical area other than the geographical area associated with the wireless communication network is a territory of the first country that is physically separated from the first country (e.g., Guam and the United States). Continuing the example, the destination identification data may comprise a country code and a national destination code, such that determining that the destination identification data corresponds to the geographical area other than the geographical area associated with the wireless communication network is based on the country code and the national destination code.

In aspects, the destination identification data may include a prefix, such as a country code for geographic areas, a country code for global services, or a country code for groups of countries. In some aspects, the prefix corresponds to a country associated with the wireless communication network that received the request. In other aspects, the prefix corresponds to a country different than the country associated with the wireless communication network that received the request. In some aspects, the prefix corresponds to a territory of the country associated with the wireless communication network that received the request (e.g., Puerto Rico and the United States, or the Canary Islands and Spain). Continuing the example, the destination identification data may also comprise an identification code, such as a three-digit identification code subsequent to the prefix, which indicates that the destination identification data corresponds to the territory of the country associated with the wireless communication network that received the request.

In some embodiments, it is determined that the destination identification data is associated with the geographical area other than the geographical area associated with the wireless communication network based on identifying another wireless communication network associated with a destination device using an identification code from the destination identification data. For instance, this determination may be based on using the prefix and the identification code of the destination identification data. The other wireless communication network associated with a destination device may also correspond to a destination network code for identifying the other wireless communication network associated with a destination device.

At 606, the destination identification data is verified as corresponding to a set of permissible data. For example, the destination identification data may be verified as corresponding to data included within a set of permissible destination identification data upon determining that the destination identification data is associated with the geographical area other than the geographical area associated with the wireless communication network. To illustrate, the prefix of the destination identification data may correspond to the country associated with the wireless communication network and a national destination code of the destination identification data may correspond to the territory of the country, the territory being physically separated from the country associated with the wireless communication network. Further, the set of permissible destination identification data may comprise a set of permissible prefixes and a set of permissible identification codes corresponding to a plurality of wireless communication networks. The plurality of wireless communication networks may correspond to the geographical area associated with the wireless communication network receiving the request, the geographical area other than the geographical area associated with the wireless communication network, both of the geographical areas, another geographical area, or a combination of the three (or more). In some aspects, the set of permissible destination identification data may comprise a set of permissible prefixes and a set of permissible national destination codes.

In other embodiments, the destination identification data is verified as corresponding to one or more of an OCN/AOCN/SPID included within a set of permissible OCN/AOCN/SPIDs upon determining that the destination identification data is associated with the geographical area associated with the wireless communication network. For example, the destination identification data may be verified using the set of permissible OCN/AOCN/SPIDs in response to determining the prefix of the destination identification data corresponds to the geographical area (e.g., the country) associated with the wireless communication network that received the request. In some aspects, the set of permissible OCN/AOCN/SPIDs is verified as associated with wireless carriers deploying a STIR/SHAKEN framework for end-to-end authentication and assertion of a telephone identity.

At 608, attestation is performed in response to verifying that the destination identification data corresponds to the set of permissible data. For example, in some embodiments, the attestation is performed in response to verifying that the destination identification data corresponds to the OCN/AOCN/SPID included within the set of permissible OCN/AOCN/SPIDs. In some embodiments, the attestation is performed in response to verifying that the destination identification data corresponds to the set of permissible destination identification data (e.g., a set of permissible prefixes and a set of permissible identification codes corresponding to a plurality of wireless communication networks). In some aspects, attestation is performed in response to verifying that the destination identification data by comparing the destination identification data associated with the request and the destination computing device to the set of permissible destination identification data comprising permissible country code and national destination code combinations. In some aspects, in response to performing attestation, an attestation claim with a digital signature is generated, the attestation claim with the digital signature being associated with the request. Continuing the example, the attestation claim with the digital signature may be transmitted for delivery to another wireless communication network associated with the destination computing device.

Turning now to FIG. 7, a diagram is depicted of an exemplary computing environment suitable for use in implementations of the present disclosure. In particular, the exemplary computer environment is shown and designated generally as UE/user device 700. User device 700 is but one example of a suitable computing environment and is not intended to suggest any limitation as to the scope of use or functionality of the invention. Neither should user device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, user device 700 includes bus 702 that directly or indirectly couples the following devices: memory 704, one or more processors 706, one or more presentation components 708, input/output (I/O) port(s) 710, I/O component(s) 712, power supply 714, and radio(s) 716. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component such as a display device to be one of I/O component(s) 712. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "user device."

User device 700 typically includes a variety of computer-readable media. Computer-readable media can be any available media that can be accessed by user device 700. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 704, memory 704 includes computer-storage media in the form of volatile or nonvolatile memory. Memory 704 may be removable, nonremovable, or a combination thereof. Examples of memory 704 include solid-state memory, hard drives, optical-disc drives, etc. For instance, memory 704 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 706, the one or more processors 706 read data from various entities such as bus 702, memory 704 or I/O component(s) 712. The one or more processors 706 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 706 execute instructions, for example, of an Operating System of the user device 700 or of one or more suitable applications.

Further, the one or more presentation components 708 present data indications to a person or other device. Examples of one or more presentation components 708 include a display device, speaker, printing component, vibrating component, etc. Additionally, I/O port(s) 710 allow user device 700 to be logically coupled to other devices including I/O component(s) 712, some of which may be built in user device 700. Illustrative I/O component(s) 712 include a microphone, joystick, game pad, satellite dish, scanner, printer, wireless device, etc. Furthermore, power supply 714 may include any suitable source of power, such as a rechargeable lithium polymer battery or an alternating current power converter.

Turning to radio 716, the radio 716 facilitates communication with a wireless telecommunication network. For example, radio 716 may facilitate communication via wireless communication signals, RF signals, frames, blocks, transmission streams, packets, messages, data items, or data. The terms "radio," "controller," "antenna," and "antenna array" are used interchangeably to refer to one or more software and hardware components that facilitate sending and receiving wireless radio-frequency signals, for example, based on instructions from a cell site. Radio 716 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, or apertures, or any combination thereof. The antennas may be capable of sending and receiving transmission via mmWaves, FD-MIMO, massive MIMO, 3G, 4G, 5G, or 802.11 protocols and techniques, etc.

Illustrative wireless telecommunications technologies that radio 716 may facilitate include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies or multiple radios can be utilized to support multiple technologies.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for enhanced selective attestation of wireless communications, the system comprising:
   one or more processors; and
   computer memory storing computer-usable instructions that, when executed by the one or more processors, perform operations comprising:
   receiving, from a wireless communication network, a request to establish a communication session with a computing device, the request being associated with destination identification data including a prefix;
   determining, based on the prefix, whether the prefix corresponds to a country other than the country associated with the wireless communication network;
   based on the determining:
   verifying that the destination identification data corresponds to data included within a set of permissible destination identification data; or
   verifying that the destination identification data corresponds to a Service Provider ID included within a set of permissible Service Provider IDs; and
   performing attestation in response to verifying the destination identification data using the set of permissible destination identification data or the set of permissible Service Provider IDs; and
   generating, in response to performing attestation, a digitally signed attestation claim associated with the request and transmitting the digitally signed attestation claim to the wireless communication network for delivery to another wireless communication network associated with the computing device.

2. The system according to claim 1, wherein the destination identification data is verified using the set of permissible Service Provider IDs in response to determining the prefix corresponds to the country associated with the wireless communication network.

3. The system according to claim 2, wherein the set of permissible Service Provider IDs is verified as associated with wireless carriers deploying a STIR/SHAKEN framework for end-to-end authentication and assertion of a telephone identity.

4. The system according to claim 1, wherein the destination identification data is verified using the set of permissible destination identification data in response to determining the prefix corresponds to the country associated with the wireless communication network and in response to determining that a national destination code of the destination identification data corresponds to a territory of the country, the territory being physically separated from the country associated with the wireless communication network.

5. The system according to claim 1, further comprising:
identifying another wireless communication network associated with the computing device using an identification code from the destination identification data; and
determining, based on the prefix and the identification code, that the other wireless communication network and the computing device correspond to the country other than the country associated with the wireless communication network.

6. The system according to claim 5, wherein the destination identification data is verified using the set of permissible destination identification data, the set of permissible destination identification data comprising a set of permissible prefixes and a set of permissible identification codes corresponding to a plurality of wireless communication networks.

7. The system according to claim 1, wherein the prefix is a country code for a geographic area.

8. A method for enhanced selective attestation of wireless communications, the method comprising:
receiving, from a wireless communication network, a request to establish a communication session with a computing device, the request being associated with destination identification data;
determining whether the destination identification data corresponds to a geographical area other than the geographical area associated with the wireless communication network;
upon determining that the destination identification data corresponds to the geographical area other than the geographical area associated with the wireless communication network, verifying that the destination identification data corresponds to data included within a set of permissible destination identification data, wherein the set of permissible destination identification data includes combinations of country codes and national destination codes, the combinations each being associated with a particular carrier of a plurality of carriers; and
performing attestation in response to verifying that the destination identification data corresponds to the data included within the set of permissible destination identification data.

9. The method according to claim 8, further comprising:
upon determining that the destination identification data corresponds to the geographical area associated with the wireless communication network, verifying that the destination identification data corresponds to a Service Provider ID included within a set of permissible Service Provider IDs; and
performing attestation in response to verifying that the destination identification data corresponds to the Service Provider ID included within the set of permissible Service Provider IDs.

10. The method according to claim 8, wherein the destination identification data comprises a country code for geographic areas, the country code being associated with the geographical area other than the geographical area associated with the wireless communication network.

11. The method according to claim 8, wherein the destination identification data comprises a country code and a national destination code, wherein determining that the destination identification data corresponds to the geographical area other than the geographical area associated with the wireless communication network is based on the country code and the national destination code, and wherein the country code and the national destination code are included in the set of permissible destination identification data.

12. The method according to claim 8, wherein the geographical area associated with the wireless communication network corresponds to a first country and the geographical area other than the geographical area associated with the wireless communication network is a territory of the first country that is physically separated from the first country.

13. Non-transitory computer-readable media having computer-usable instructions embodied thereon that, when executed by a processor, perform operations for enhanced selective attestation of wireless communications, the operations comprising:
receiving, from a wireless communication network via a first computing device, a request to establish a communication session with a second computing device, the request and the second computing device being associated with destination identification data;
determining, based on the destination identification data, whether the destination identification data is associated with a geographical area other than the geographical area associated with the wireless communication network;
based on the determining:
verifying that the destination identification data corresponds to data included within a set of permissible destination identification data upon determining that the destination identification data is associated with the geographical area other than the geographical area associated with the wireless communication network; or
verifying that the destination identification data corresponds to a Service Provider ID included within a set of permissible Service Provider IDs upon determining that the destination identification data is associated with the geographical area associated with the wireless communication network; and
performing attestation in response to verifying the destination identification data; and
generating, in response to performing attestation, an attestation claim with a digital signature associated with the request and transmitting the attestation claim with the digital signature for delivery to another wireless communication network associated with the second computing device.

14. The non-transitory computer-readable media of claim 13, further comprising:
identifying another wireless communication network associated with the second computing device using an identification code from the destination identification data, the identification code uniquely identifying the other wireless communication network as an international network; and determining that the destination identification data is associated with the geographical area other than the geographical area associated with the wireless communication network based at least in part on the identification code.

15. The non-transitory computer-readable media of claim 13, wherein the set of permissible destination identification data comprises country code and national destination code combinations, wherein verifying that the destination identification data comprises comparing the destination identification data associated with the request and the second computing device to the country code and national destination code combinations.

16. The non-transitory computer-readable media of claim 13, wherein the geographical area associated with the wireless communication network corresponds to a first country and the geographical area other than the geographical area associated with the wireless communication network is a territory of the first country that is physically separated from the first country.

17. The non-transitory computer-readable media of claim 16, wherein determining that the destination identification data is associated with the territory of the first country that is physically separated from the first country is based at least in part on a country code and a national destination code of the destination identification data.

* * * * *